US012031495B1

(12) United States Patent
Seville et al.

(10) Patent No.: US 12,031,495 B1
(45) Date of Patent: Jul. 9, 2024

(54) SYSTEM AND A METHOD FOR DETERMINING FUEL INJECTOR LEAK

(71) Applicant: Volvo Truck Corporation, Gothenburg (SE)

(72) Inventors: Benjamin Seville, Waynesboro, PA (US); Kyle Hilling, Hedgesville, WV (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/542,887

(22) Filed: Dec. 18, 2023

(30) Foreign Application Priority Data

Dec. 20, 2022 (EP) .................................... 22215167

(51) Int. Cl.
*F02D 41/22* (2006.01)
*F02D 41/38* (2006.01)

(52) U.S. Cl.
CPC ......... *F02D 41/22* (2013.01); *F02D 41/3836* (2013.01); *F02D 2041/225* (2013.01)

(58) Field of Classification Search
CPC .... F02D 41/22; F02D 41/221; F02D 41/3845; F02D 2041/225; F02D 2041/1409
See application file for complete search history.

(56) References Cited

U.S. PATENT DOCUMENTS

| | | | | |
|---|---|---|---|---|
| 6,105,554 | A * | 8/2000 | Nishiyama | F02D 41/12 123/436 |
| 9,644,556 | B2 * | 5/2017 | Pursifull | F02D 19/061 |
| 2015/0106040 | A1 | 4/2015 | Methil et al. | |
| 2019/0063284 | A1 * | 2/2019 | Santillo | F01N 11/002 |
| 2019/0211768 | A1 * | 7/2019 | Dudar | F02D 41/18 |
| 2020/0173298 | A1 * | 6/2020 | Romagnoli | F01D 11/10 |

FOREIGN PATENT DOCUMENTS

| | | | |
|---|---|---|---|
| DE | 102016119811 | A1 | 4/2018 |
| DE | 102020214226 | A1 | 5/2022 |
| FR | 3106857 | A1 | 8/2021 |

OTHER PUBLICATIONS

Extended European Search Report for European Patent Application No. 22215167.2, mailed Jun. 28, 2023, 7 pages.

* cited by examiner

*Primary Examiner* — John Kwon
(74) *Attorney, Agent, or Firm* — Sage Patent Group

(57) ABSTRACT

A method of determining fuel leak of fuel injectors of an injection system of a combustion engine, said method including determining a baseline pressure based on a predetermined integral response threshold and for each fuel injector determining a primary reference integral response by obtaining the associated primary reference integral response by obtaining the current integral response while running the engine at the baseline pressure with the respective fuel injector fluidly isolated.

17 Claims, 2 Drawing Sheets

SYSTEM AND A METHOD FOR DETERMINING FUEL INJECTOR LEAK

CROSS REFERENCE TO RELATED APPLICATION

This application claims foreign priority to European Application No. 22215167.2 filed on Dec. 20, 2022, the disclosure and content of which is incorporated by reference herein in its entirety.

TECHNICAL FIELD

The disclosure relates generally to testing of fuel injectors of a combustion engine. In particular aspects, the disclosure relates to a system and a method for determining fuel leaks. The disclosure can be applied in heavy-duty vehicles, such as trucks, buses, and construction equipment. Although the disclosure may be described with respect to a particular vehicle, the disclosure is not restricted to any particular vehicle.

BACKGROUND

Combustions engines may be provided with a fuel injection system comprising fuel injectors fluidly connected to a fuel rail. Fuel in the fuel rail is pressurized by one or more fuel pumps and the pressurized fuel is injected into the engine when running the engine. If the fuel injectors are worn or faulty, fuel may leak from the fuel injection system, leading to sub-optimal combustion and/or excessive fuel consumption. A fuel injection system is typically controlled by a control unit. The control unit may be connected to one or more pressure sensors adapted to measure fluid pressure in the fuel injection system, such as in the fuel rail. The control unit typically comprises a proportional-integral-derivative controller (PID controller) adapted to control the at least one fuel pump (4*a*, 4*b*) based on at least the fuel pressure in the fuel rail (5). The PID controller may be implemented in any suitable way, such as in software and/or hardware. An integral response of the PID controller represents the fuel leak rate of the fuel injection system. The control unit may indicate that the fuel injection system as a whole is leaky in response to the integral response exceeding a threshold value. When a leaking fuel injection system is indicated, a mechanic may replace all fuel injectors to mitigate the leakage. However, fuel injectors are expensive and not always available off the shelf. Accordingly, it would be advantageous to be able to identify which fuel injectors are leaking and how much they are leaking, such that only bad injectors can be replaced.

SUMMARY

A first aspect of the disclosure relates to a system, said system comprising a fuel injection system and a computer system comprising a processor device.

The fuel injection system comprises:

- a fuel rail defining a fuel conduit for transporting fuel,
- at least one fuel pump fluidly connected to the fuel rail,
- a plurality of fuel injectors, each one of the plurality of fuel injectors being fluidly connected to the fuel rail, and
- a proportional-integral-derivative controller (PID controller) adapted to control the at least one fuel pump based on at least a fuel pressure in the fuel rail.

The processor device is configured to, with the engine running, control the at least one fuel pump to increase the pressure in the fuel rail to a baseline pressure at which an integral response of the PID controller reaches a predetermined integral response threshold.

The processor device is configured to, for each respective fuel injector, determine a primary reference integral response associated with the fuel injector by:

- fluidly isolating each fuel injector from the fuel rail, with all other fuel injectors fluidly connected to the fuel rail, by controlling a respective valve between the respective fuel injector and the fuel rail,
- with the engine running, controlling the at least one fuel pump to increase the pressure in the fuel rail until the pressure in the fuel rail reaches the baseline pressure, and obtaining the respective primary reference integral response by obtaining the current integral response.

Upon fluidly isolating a fuel injector from the fuel rail any leak by the fluidly isolated fuel injector is no longer affecting the integral response reported by the PID controller. The integral response of the PID controller corresponds to a rate of any leak of fuel affecting the pressure in the fuel rail. Running the engine at a specific fuel rail pressure with a specific injector fluidly connected to the fuel rail gives a first integral response. Running the engine at the specific fuel rail pressure with the specific injector fluidly isolated from the fuel rail gives a second integral response. By comparing the first and second integral responses leak by the specific fuel injector can be determined based on any difference between the first and second integral responses.

Some fuel injectors may only leak a little, and only when operated above a certain pressure. To be able to make comparisons of leak rates of the fuel injectors, a baseline pressure is first established by studying the leak rate, i.e. the integral response, of the fuel injection system whilst running the engine with all fuel injectors fluidly connected to the fuel rail. The fuel rail pressure is increased until the integral response reaches a predetermined integral response threshold. The engine is then run at the baseline pressure when determining the effect of fluid isolation of each fuel injector from the fuel rail.

Obtaining the primary reference integral responses associated with each fuel injector, provides information indicating the leak rate of each fuel injector. This information enables a decision to be made as to whether or not to replace one or more fuel injectors, thereby mitigating the need of replacing all fuel injectors when the fuel injection system is leaking.

In some examples, the processor device may further be configured to, before, or after, determining the primary reference integral responses, for each fuel pump or combination of fuel pumps used together/to be used together when determining the primary reference integral responses, determine a respective baseline integral response associated with the fuel pump or combination of fuel pumps.

Each respective baseline integral response is determined by:

- with the engine running with all fuel injectors fluidly connected to the fuel rail, supplying fuel to the fuel rail only using the respective fuel pump or combination of fuel pumps, setting the fuel pressure in the fuel rail to the baseline pressure, and
- obtaining the respective baseline integral response by obtaining the current integral response. Thereby, information (i.e. the respective baseline integral response) is provided indicating a reference leak rate for use when assessing the leak rate of each fuel injector.

If one or more auxiliary fuel pumps are used, it is possible to obtain primary reference integral responses for all fuel injectors using the same fuel pump(s). If only pumping fuel injectors are used as fuel pumps, not all pumping fuel injectors can be used when determining primary reference integral responses, since individual pumping fuel injectors need to be fluidly isolated from the fuel rail.

An effect on the integral response caused by leaks of a fuel injector can be determined by comparing the primary reference integral response to the predetermined integral response threshold. However, the result of the comparison may be affected by a change in which fuel pumps are used when determining the primary reference integral responses, due to variations in integral response associated with running the fuel pumps at different rates required when reducing the number of fuel pumps as compared to the number of fuel pumps used when obtaining the baseline pressure.

Since the baseline integral response is obtained using only those fuel pumps also used when determining the primary reference integral response for each respective fuel injector, the effects, on the integral response, of using different pumps to pressurize the fuel injection system, is accounted for by the baseline integral response(s) obtained. By instead comparing the primary reference integral response to the baseline integral response, the effect on the change of which fuel pumps are used, is accounted for, thereby providing more accurate information for use when determining the leak rate of each fuel injector.

A second aspect of the disclosure relates to a method for determining fuel leak of one or more fuel injectors of a fuel injection system of a combustion engine.

The fuel injection system comprises:

a fuel rail defining a fuel conduit for transporting fuel, at least one fuel pump fluidly connected to the fuel rail, a plurality of fuel injectors, each one of the plurality of fuel injectors being fluidly connected to the fuel rail, and a proportional-integral-derivative controller (PID controller) adapted to control the at least one fuel pump based on at least a fuel pressure in the fuel rail.

The method comprises:

with the engine running, controlling the at least one fuel pump to increase the pressure in the fuel rail until an integral response of the PID controller reaches a predetermined integral response threshold, said fuel pressure at which the threshold is met hereinafter being referred to as a baseline pressure, for each respective fuel injector determining a primary reference integral response associated with the fuel injector, by:

a) with each respective fuel injector fluidly isolated from the fuel rail, with all other fuel injectors fluidly connected to the fuel rail, and b) with the engine running, controlling the at least one fuel pump to increase the pressure in the fuel rail until the pressure in the fuel rail reaches the baseline pressure, and obtaining the primary reference integral response associated with the respective fluidly isolated fuel injector by obtaining the current integral response.

Upon fluidly isolating a fuel injector from the fuel rail any leak by the fluidly isolated fuel injector is no longer affecting the integral response reported by the PID controller. The integral response of the PID controller corresponds to a rate of any leak of fuel affecting the pressure in the fuel rail. Running the engine at a specific fuel rail pressure with a specific injector fluidly connected to the fuel rail gives a first integral response. Running the engine at the specific fuel rail pressure with the specific injector fluidly isolated from the fuel rail gives a second integral response. By comparing the integral first and second integral responses leak by the specific fuel injector can be determined based on any difference between the first and second integral responses.

Some fuel injectors may only leak a little, and only when operated above a certain pressure. To be able to make comparisons of leak rates of the fuel injectors, a baseline pressure is first established by studying the leak rate, i.e. the integral response, of the fuel injection system whilst running the engine with all fuel injectors fluidly connected to the fuel rail. The fuel rail pressure is increased until the integral response reaches a predetermined integral response threshold. The engine is then run at the baseline pressure when determining the effect of fluid isolation of each fuel injector from the fuel rail.

Obtaining the primary reference integral responses associated with each fuel injector, provides information indicating the leak rate of each fuel injector. This information enables a decision to be made as to whether or not to replace one or more fuel injectors, thereby mitigating the need of replacing all fuel injectors when the fuel injection system is leaking.

In some examples, the method further comprises:

c) for each fuel pump or combination of fuel pumps used together/to be used together when determining the primary reference integral responses, determining a respective baseline integral response associated with the fuel pump or combination of fuel pumps, by: with the engine running, with all fuel injectors fluidly connected to the fuel rail, controlling the fuel pumps such that fuel is supplied to the fuel rail only by said fuel pump or combination of fuel pumps, controlling the pressure in the fuel rail to the baseline pressure, and obtaining the respective baseline integral response by obtaining the current integral response. Thereby, information (i.e. the respective baseline integral response) is provided indicating a reference leak rate for use when assessing the leak rate of each fuel injector.

If one or more auxiliary fuel pumps (i.e. a pump not being a pump of a pumping fuel injector) are used, it is possible to obtain primary reference integral responses for all fuel injectors using the same fuel pump(s). If only pumping fuel injectors are used as fuel pumps, not all pumping fuel injectors can be used when determining primary reference integral responses, since individual pumping fuel injectors need to be fluidly isolated from the fuel rail.

An effect on the integral response caused by leaks of a fuel injector can be determined by comparing the primary reference integral response to the predetermined integral response threshold. However, the result of the comparison may be affected by a change in which fuel pumps are used when determining the primary reference integral responses due to variations in integral response associated with running the fuel pumps at different rate required when reducing the number of fuel pumps as compared to the number of fuel pumps used when obtaining the baseline pressure.

Since the baseline integral response is obtained using only those fuel pumps also used when determining the primary reference integral response for each respective fuel injector, the effects, on the integral response, of using different pumps to pressurize the fuel injection system, is accounted for by the baseline integral response(s) obtained. By instead comparing the primary reference integral response to the baseline integral response, the effect on the change of which fuel pumps are used, is accounted for, thereby providing more accurate information for use when determining the leak rate of each fuel injector.

In some examples, the fuel injection system comprises at least two fuel pumps, wherein said obtaining of the primary reference integral response for each fuel injector is performed using only one fuel pump at a time, by enabling one of the fuel pumps, and disabling the other fuel pump(s).

Using only one fuel pump reduces uncertainty related to leaks of the fuel pumps.

In some examples, a subset of the fuel injectors are pumping fuel injectors, wherein each fuel pump is a pump of a respective one of the pumping fuel injectors, and wherein the obtaining of the primary reference integral response for each fuel injector comprises, for each pumping fuel injector fluidly isolated from the fuel rail, using one of the other pumping fuel injectors as the fuel pump for pressurizing the fuel rail when obtaining the primary reference integral response associated with the fluidly isolated pumping fuel injector.

In some examples, the fuel injection system comprises at least three pumping fuel injectors, wherein the method further comprises determining two reference pumping fuel injectors. The determination of two reference pumping fuel injectors is performed before determining the primary reference integral responses. The determination of the two reference pumps comprises:

- obtaining a secondary reference integral response for each pumping fuel injector by, for each respective pumping fuel injector:
- with the engine running, enabling fuel supply to the fuel rail by the fuel pump of the respective pumping fuel injector, and disabling the fuel supply to the fuel rail by the other pumping fuel injectors, and
- obtaining the respective secondary reference integral response by obtaining the current integral response.

The two reference pumping fuel injectors are determined as the two pumping fuel injectors with most similar secondary reference integral responses.

Once the two reference pumping fuel injectors have been determined, the determination of the primary reference integral responses is performed using only the fuel pumps of the two reference pumping fuel injectors.

In some examples, the method further comprises:

- for each respective fuel injector:
- determining a fuel leak value of the fuel injector, said fuel leak value being a difference between the primary reference integral response associated with the fuel injector and the respective baseline integral response, or, if no baseline integral response has been obtained, a difference between the primary reference integral response associated with the fuel injector and the predetermined integral response threshold.

The fuel leak value indicates how much a fuel injector leaks in absolute terms, and thus enables easy comparison of the difference in leak rate of each fuel injector.

In some examples, the method further comprises comparing each fuel leak value of all fuel injectors to a predetermined first fuel leak threshold, and, in response to the fuel leak value exceeding the first fuel leak threshold, providing an indication that the fuel injector associated with the fuel leak value should be replaced.

In some examples, the method further comprises comparing a first aggregate fuel leak value to a first aggregate fuel leak threshold. The first aggregate fuel leak value is the sum of the respective fuel leak values of all pumping fuel injectors not yet determined to need replacement. The first aggregate fuel leak threshold is a second fuel leak threshold multiplied by the number of pumping fuel injectors not yet determined to need replacement. The second fuel leak threshold is lower than the first fuel leak threshold.

The method further comprises, in response to the first aggregate fuel leak value exceeding the first aggregate fuel leak threshold, providing an indication that all pumping fuel injectors should be replaced.

In some examples, the method further comprises comparing a second aggregate fuel leak value to a second aggregate fuel leak threshold.

The second aggregate fuel leak value is the sum of the respective fuel leak values of all fuel injectors except the pumping fuel injectors, and except any fuel injectors for which an indication of replacement has been provided.

The second aggregate fuel leak threshold is a third fuel leak threshold multiplied by the number of fuel injectors of the fuel injection system except the pumping fuel injectors, and except any fuel injectors for which an indication of replacement has been provided, said third fuel leak threshold being lower than the first fuel leak threshold.

The method further comprises, in response to the second aggregate fuel leak value exceeding the second aggregate fuel leak threshold, providing an indication that all fuel injectors not being pumping fuel injectors, should be replaced.

In some examples, fluid isolation of a fuel injector is achieved by:

- with the engine stopped, physically removing the fuel injector to be fluidly isolated from the fuel rail and plugging a corresponding port of the fuel rail.
- If the fuel injection system is not provided with shut-off valves for fluid isolation of each injector from the fuel rail, the fluid isolation is performed by physically removing the fuel injector from the fuel rail and plugging the port of the fuel injection system.

In some examples, fluid isolation of a fuel injector is achieved by:

- closing one or more valves between the fuel rail and the fuel injector to be fluidly isolated, such that fuel is prevented from moving between the fuel injector and the fuel rail.
- If the fuel injection system is provided with shut-off valves for isolation of each injector from the fuel rail, the isolation may be performed by closing the one or more valves such that fuel is prevented from moving between the fuel injector and the fuel rail.

A third aspect relates to a vehicle comprising the processor device to perform the method of the examples described above.

A fourth aspect relates to a computer program product comprising program code for performing, when executed by the processor device, the method of the examples described above.

A fifth aspect relates to a control system comprising one or more control units configured to perform the method of the examples described above.

A sixth aspect relates to a non-transitory computer-readable storage medium comprising instructions, which when executed by the processor device, cause the processor device to perform the method of the examples described above.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

A control unit or computer system 6 of a combustion engine may indicate that the fuel injection system of the engine is leaking. To avoid replacing all fuel injectors of the fuel injection system, it would be advantageous to be able to identify which fuel injectors are leaking and how much they are leaking, such that only bad injectors can be replaced.

The system and method disclosed herein enables relevant data to be obtained such that an informed decision can be made as to the rate of leak of each fuel injector. Based on the data, a mechanic can determine which fuel injectors are causing leaks and replace only such fuel injectors. The proposed system and method provides the relevant data in a time-efficient manner.

The disclosure is based on a method which can be implemented in software and/or hardware, except for any manually performed steps in specific embodiments of the disclosure, such as physical removal of a fuel injector 2*a*, 2*b* from the fuel rail 5 and subsequent plugging of a port of the fuel rail 5.

Embodiments of a method of the present disclosure will hereinafter be described with reference to the appended schematic figures. The method is applicable to any combustion engine comprising at least two fuel injectors. By way of example, the combustion engine is an internal combustion engine, such as a diesel internal combustion engine, a gaseous internal combustion engine. Moreover, the fuel may generally be any one of a diesel fuel and a gaseous fuel, such as a hydrogen-based fuel or the like. In the example below, the combustion engine is an internal combustion engine for a heavy-duty vehicle, which is operable on a diesel fuel.

A control unit or computer system 6 is provided (not shown) to monitor various sensors of the engine, such as fuel rail pressure and crankshaft position, and to control the fuel injection cycle, fuel rail pressure, etc. Such control units or computer systems 6 for running fuel injected combustion engines are known in the art and will not be described in greater detail.

The control unit or computer system 6 used herein implements a proportional-integral-derivative controller (PID controller) which monitors fuel pressure in the fuel injection system and calculates at least an integral response. The integral represents a fuel leak rate of the fuel injection system. PID controllers are known in the art and will not be described in any greater detail herein. The PID controller can be implemented in any suitable way, such as by the computer system 6 or control unit running a software, or by dedicated hardware.

As further discussed at the end of this description, the computer system 6 may include any collection of devices that individually or jointly execute a set (or multiple sets) of instructions to perform any one or more of the methodologies discussed herein.

Figure 1:
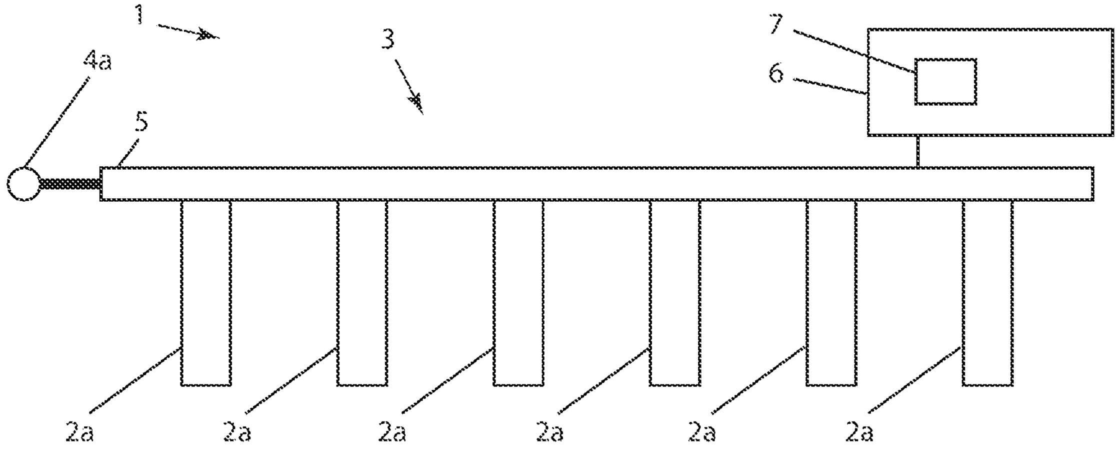
FIG. 1 shows a schematic diagram of an exemplary embodiment of a system comprising a fuel injection system provided with an auxiliary fuel pump and only non-pumping fuel injectors.
Figure 2:
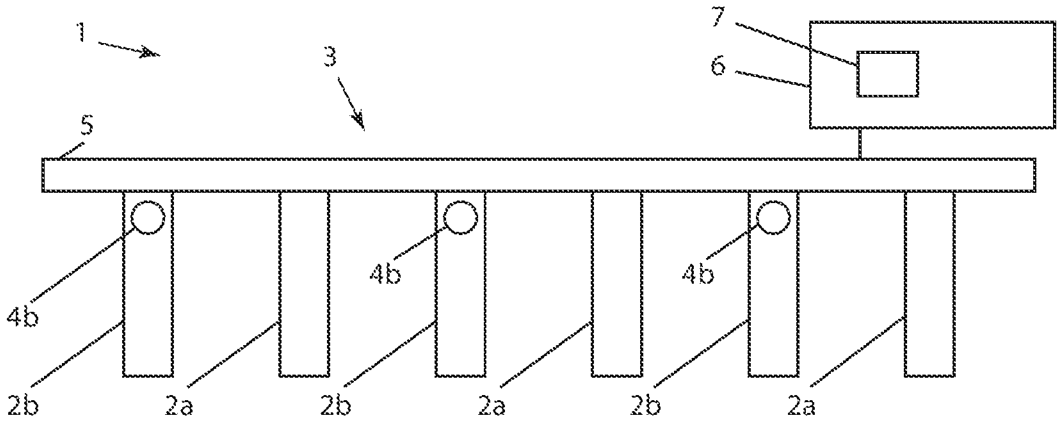
FIG. 2 shows a schematic diagram of an exemplary embodiment of a system comprising a fuel injection system provided with three non-pumping fuel injectors and three pumping fuel injectors.

FIGS. 1 and 2 show a respective embodiment of a system comprising a fuel injection system 3 and a computer system 6 comprising a processor device 7. The fuel injection system 3 comprises:

- a fuel rail 5 defining a fuel conduit for transporting fuel,
- at least one fuel pump 4*a*, 4*b* fluidly connected to the fuel rail 5,
- a plurality of fuel injectors 2*a*, 2*b*, each one of the plurality of fuel injectors 2*a*, 2*b* being fluidly connected to the fuel rail 5, and
- a proportional-integral-derivative controller (PID controller) adapted to control the at least one fuel pump 4*a*, 4*b* based on at least a fuel pressure in the fuel rail 5. In these embodiments, six fuel injectors 2*a*, 2*b* are shown, but in other embodiments any other suitable number of fuel injectors may be provided. In FIG. 1, all fuel injectors 2*a* are non-pumping fuel injectors. In the embodiment of FIG. 2, three fuel injectors 2*b* are pumping fuel injectors 2*b*, i.e. fuel injectors 2*b* with a respective integrated pump 4*b* for pumping fuel into the fuel rail 5 from a fuel supply conduit (not shown). In other embodiments, any other suitable number of pumping fuel injectors 2*b* may be provided, such as no pumping fuel injectors 2*b*, wherein auxiliary fuel pumps 4*a* would be used instead (FIG. 1 embodiment).

The processor device 7 is configured to:

- with the engine running, control the at least one fuel pump 4*a*, 4*b* to increase the pressure in the fuel rail 5 to a baseline pressure at which an integral response of the PID controller reaches a predetermined integral response threshold.

The processor device 7 is further configured to:

- for each respective fuel injector 2*a*, 2*b*, determine a primary reference integral response associated with the fuel injector 2*a*, 2*b* by:
- fluidly isolating each fuel injector 2*a*, 2*b* from the fuel rail 5, with all other fuel injectors 2*a*, 2*b* fluidly connected to the fuel rail 5, by controlling a respective valve between the respective fuel injector and the fuel rail 5,
- with the engine running, controlling the at least one fuel pump 4*a*, 4*b* to increase the pressure in the fuel rail 5 until the pressure in the fuel rail 5 reaches the baseline pressure, and
- obtaining the respective primary reference integral response by obtaining the current integral response.

Hence, this embodiment of the system implements an automated leak test procedure including automated fluid isolation of fuel injectors 2*a*, 2*b*, by operation of a valve (not shown) provided between each fuel injector 2*a*, 2*b* and the fuel rail 5. In an alternative embodiment, the fluid isolation could instead be enabled by the processor device 7 by stopping the engine, waiting for a mechanic to physically remove the fuel injector and plug the fuel rail, and subsequently starting the engine such that the respective primary reference integral response can be obtained.

The processor device 7 may further be configured to:

before, or after, determining the primary reference integral responses, for each fuel pump 4*a*, 4*b* or combination of fuel pumps 4*a*, 4*b* used together/to be used together when determining the primary reference integral responses, determine a respective baseline integral response associated with the fuel pump 4*a*, 4*b* or combination of fuel pumps 4*a*, 4*b*, by:

with the engine running with all fuel injectors 2*a*, 2*b* fluidly connected to the fuel rail 5, supplying fuel to the fuel rail only using the respective fuel pump 4*a*, 4*b* or combination of fuel pumps 4*a*, 4*b*, setting the fuel pressure in the fuel rail 5 to the baseline pressure, and obtaining the respective baseline integral response by obtaining the current integral response.

By comparing the primary reference integral response to the baseline integral response, the effect on the change of which fuel pumps are used, is accounted for, thereby providing more accurate information for use when determining the leak rate of each fuel injector.

Figure 5:
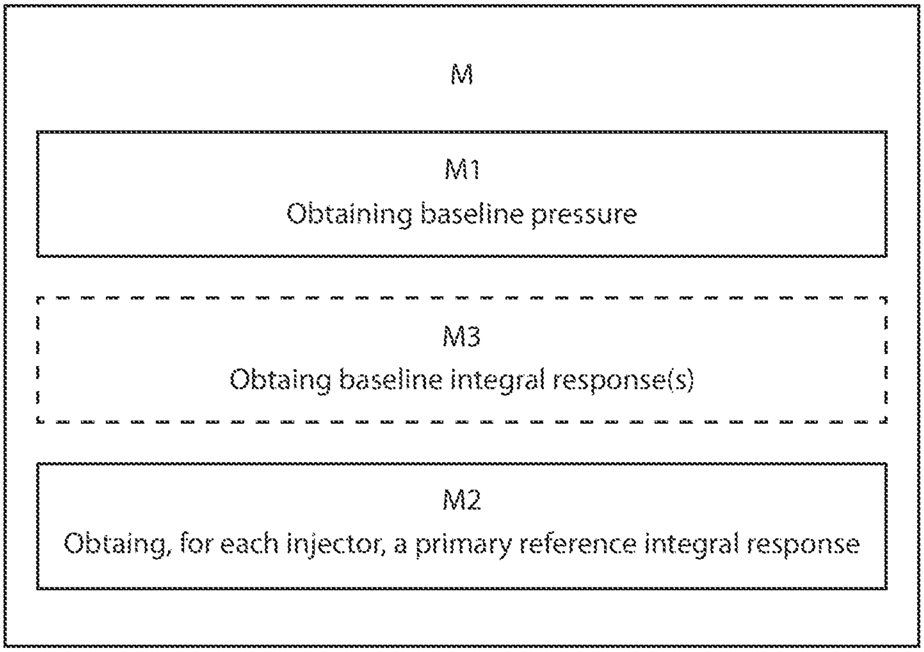
FIG. 5 is a schematic diagram of an exemplary computer system for implementing examples disclosed herein, according to one example.

As shown in FIG. 5, the present disclosure further proposes the following embodiments of a method M for determining fuel leak of one or more fuel injectors 2*a*, 2*b* of a fuel injection system 3 of a combustion engine.

As shown in FIGS. 1 and 2, the fuel injection system 3 on which the method is used comprises:

a fuel rail 5 defining a fuel conduit for transporting fuel, at least one fuel pump 4*a*, 4*b* fluidly connected to the fuel rail, a plurality of fuel injectors 2*a*, 2*b*, each one of the plurality of fuel injectors 2*a*, 2*b* being fluidly connected to the fuel rail 5, and a proportional-integral-derivative controller (PID controller) adapted to control the at least one fuel pump 4*a*, 4*b* based on at least a fuel pressure in the fuel rail 5.

As shown in FIG. 5, the method comprises:

with the engine running, controlling the at least one fuel pump 4*a*, 4*b* to increase the pressure in the fuel rail 5 to a baseline pressure at which an integral response of the PID controller reaches a predetermined integral response threshold, and for each respective fuel injector 2*a*, 2*b* determining a primary reference integral response associated with the fuel injector 2*a*, 2*b*, by:

with each respective fuel injector 2*a*, 2*b* fluidly isolated from the fuel rail 5, with all other fuel injectors 2*a*, 2*b* fluidly connected to the fuel rail 5, and with the engine running, controlling the at least one fuel pump 5 to increase the pressure in the fuel rail 5 until the pressure in the fuel rail 5 reaches the baseline pressure, and obtaining the primary reference integral response associated with the respective isolated fuel injector 2*a*, 2*b* by obtaining the current integral response.

The method M may comprise:

for each fuel pump 4*a*, 4*b* or combination of fuel pumps 4*a*, 4*b* used together/to be used together when determining the primary reference integral responses, determining a respective baseline integral response associated with the fuel pump 4*a*, 4*b* or combination of fuel pumps 4*a*, 4*b*, by:

with the engine running, with all fuel injectors 2*a*, 2*b* fluidly connected to the fuel rail 5, controlling the fuel pumps 4*a*, 4*b* such that fuel is supplied to the fuel rail only by the fuel pump 4*a*, 4*b* or combination of fuel pumps 4*a*, 4*b*, controlling the pressure in the fuel rail 5 to the baseline pressure, and obtaining the respective baseline integral response by obtaining the current integral response.

Throughout the present disclosure, integral responses obtained may be stored in a memory 8. Storing of data in memory 8 may be controlled by a processor device 7.

As shown in the embodiment of FIG. 2, the fuel injection system 3 may comprise three fuel pumps 4*a*, 4*b*. When at least two fuel pumps 4*a*, 4*b* are provided, the determination of the primary reference integral response for each fuel injector 2*a*, 2*b* may be performed using only one fuel pump 4*a*, 4*b* at a time, by enabling one of the fuel pumps 4*a*, 4*b*, and disabling the other fuel pumps 4*a*, 4*b*.

As shown in FIG. 2. a subset of the fuel injectors 2*b* may be pumping fuel injectors 2*b* used as the fuel pumps 4*b* for supplying fuel and pressurizing the fuel injection system 3. For such embodiments of the fuel injection system 3, the determination of the primary reference integral response for each fuel injector may comprise, for each pumping fuel injector 2*b* fluidly isolated from the fuel rail 5, using one of the other pumping fuel injectors 2*b* as the fuel pump 2*b* for pressurizing the fuel rail 5 when obtaining the primary reference integral response associated with the fluidly isolated pumping fuel injector 2*b*.

As shown in FIG. 2, wherein the fuel injection system 3 may comprise at least three pumping fuel injectors 2*b*. For such embodiments of the fuel injection system 3, the method may further comprise determining two reference pumping fuel injectors 2*b*, said determination of two reference pumping fuel injectors 2*b* to be performed before determining the primary reference integral responses.

The determination of the two reference pumps comprises:

obtaining a secondary reference integral response for each pumping fuel injector 2*b* by, for each respective pumping fuel injector 2*b*:

with the engine running, enabling the fuel supply to the fuel rail 5 by the fuel pump 4*b* of the respective pumping fuel injector 2*b*, and disabling the fuel supply to the fuel rail 5 by the other pumping fuel injectors 2*b*, and obtaining the respective secondary reference integral response by obtaining the current integral response. The two reference pumping fuel injectors 2*b* are then determined as the two pumping fuel injectors 2*b* with most similar secondary reference integral responses.

In this embodiment of the method, the determination of the primary reference integral responses is performed using only the fuel pumps of the two reference pumping fuel injectors.

To enable easier interpretation of the leak rates of each injector, the method M may comprise:

for each respective fuel injector 2*a*, 2*b*:

determining a fuel leak value of the fuel injector 2*a*, 2*b*, said fuel leak value being a difference between the primary reference integral response associated with the fuel injector 2*a*, 2*b* and the respective baseline integral response, or, if no baseline integral response has been obtained, a difference between the primary reference integral response associated with the fuel injector 2*a*, 2*b* and the predetermined integral response threshold.

If fuel leak values have been determined, the method M may further comprise performing a first test (M1) by:

comparing each fuel leak value of all fuel injectors 2*a*, 2*b* to a predetermined first fuel leak threshold, and, in response to the fuel leak value exceeding the first fuel leak threshold, providing an indication that the fuel injector 2*a*, 2*b* associated with the fuel leak value should be replaced. In this way, fuel injectors that leak too much can be detected and an indication for replacement provided.

Such an indication is easy to interpret by a mechanic.

Indications may be provided in the form of data displayed on a display device or in by storing in a memory 8 data representing the indication. A processor device 7 may be used to control data storing or to control data display on a display device. This applies also to any further tests described below.

Fuel injectors which leak less than the first fuel leak threshold may still be considered for further use, although further tests may indicate that they need to be replaced after all, as discussed below.

The method M may further comprise performing a second test by comparing a first aggregate fuel leak value to a first aggregate fuel leak threshold.

The first aggregate fuel leak value is the sum of the respective fuel leak values of all pumping fuel injectors 2*b* not yet determined to need replacement.

The first aggregate fuel leak threshold is a second fuel leak threshold multiplied by the number of pumping fuel injectors 2*b* not yet determined to need replacement (i.e. no indication that the fuel injector 2*a*, 2*b* associated with the fuel leak value should be replaced has been provided during prior testing).

The second fuel leak threshold is lower than the first fuel leak threshold.

The method further comprises, in response to the first aggregate fuel leak value exceeding the first aggregate fuel leak threshold, to provide an indication that all pumping fuel injectors 2*b* should be replaced.

Hence, the first test may reveal that individual fuel injectors 2*a*, 2*b* leak too much and provide an indication of replacement. Thereafter, a second test may look at the total leak of the remaining pumping fuel injectors 2*b*, and if the total leak rate from those fuel injectors 2*b* is too high indicate that all pumping fuel injectors 2*b* should be replaced.

Such an indication is easy to interpret by a mechanic.

The method M may further comprise performing a third test by comparing a second aggregate fuel leak value to a second aggregate fuel leak threshold.

The second aggregate fuel leak value is the sum of the respective fuel leak values of all fuel injectors 2*a* except the pumping fuel injectors 2*b* (i.e. of a non-pumping fuel injectors), and except any fuel injectors 2*a*, 2*b* for which an indication of replacement has been provided. The second aggregate fuel leak threshold is a third fuel leak threshold multiplied by the number of fuel injectors 2*a*, 2*b* of the fuel injection system, except the pumping fuel injectors 2*b*, and except any fuel injectors 2*a*, 2*b* for which an indication of replacement has been provided. The third fuel leak threshold is lower than the first fuel leak threshold.

The method further comprises, in response to the second aggregate fuel leak value exceeding the second aggregate fuel leak threshold, to provide an indication that all fuel injectors 2*a* not being pumping fuel injectors 2*b*, should be replaced.

The fluid isolation of the fuel injector 2*a*, 2*b* may be achieved by:

with the engine stopped, physically removing the fuel injector 2*a*, 2*b* to be fluidly isolated from the fuel rail 5 and plugging a corresponding port of the fuel rail 5.

Once the respective primary reference integral response has been obtained, the fluidly isolated fuel injector 2*a*, 2*b* is re-attached to the fuel rail, thereby fluidly connecting the respective fuel injector 2*a*, 2*b* to the fuel rail 5 again such that fuel can be injected by the respective fuel injector 2*a*, 2*b* when isolating other fuel injectors and running the engine.

Alternatively, the fluid isolation of a fuel injector 2*a*, 2*b* may be achieved by: closing one or more valves between the fuel rail 5 and the fuel injector 2*a*, 2*b* to be fluidly isolated, such that fuel is prevented from moving between the fuel injector 2*a*, 2*b* and the fuel rail 5.

Once the respective primary reference integral response has been obtained, the one or more valve is opened again, thereby fluidly connecting the respective fuel injector 2*a*, 2*b* to the fuel rail 5 again such that fuel can be injected by the respective fuel injector 2*a*, 2*b* when isolating other fuel injectors and running the engine.

Figure 3:
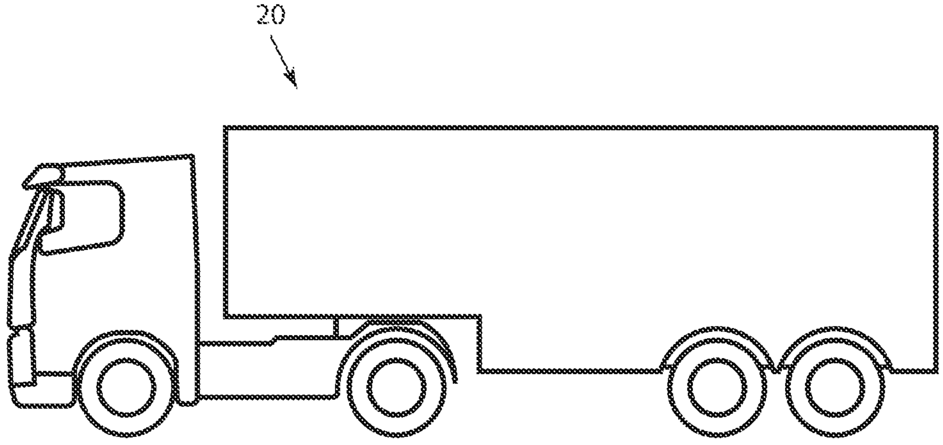
FIG. 3 shows a schematic view of a vehicle according to an example.

As shown in FIG. 3, the present disclosure also proposes a vehicle 20 comprising the processor device 7 to perform any one of the above-described embodiments of the method M for determining fuel leak of one or more fuel injectors. The vehicle 20 may be a heavy-duty vehicle, such as a trucks, a bus, or construction equipment.

It is also proposed to provide a computer program product comprising program code for performing, when executed by the processor device 7, any one of the above-described embodiments of the method M for determining fuel leak of one or more fuel injectors.

It is also proposed to provide a control system comprising one or more control units configured to perform any one of the above-described embodiments of the method M for determining fuel leak of one or more fuel injectors.

It is also proposed to provide a non-transitory computer-readable storage medium comprising instructions, which when executed by the processor device 7, cause the processor device 7 to perform any one of the above-described embodiments of the method M for determining fuel leak of one or more fuel injectors.

Figure 4:
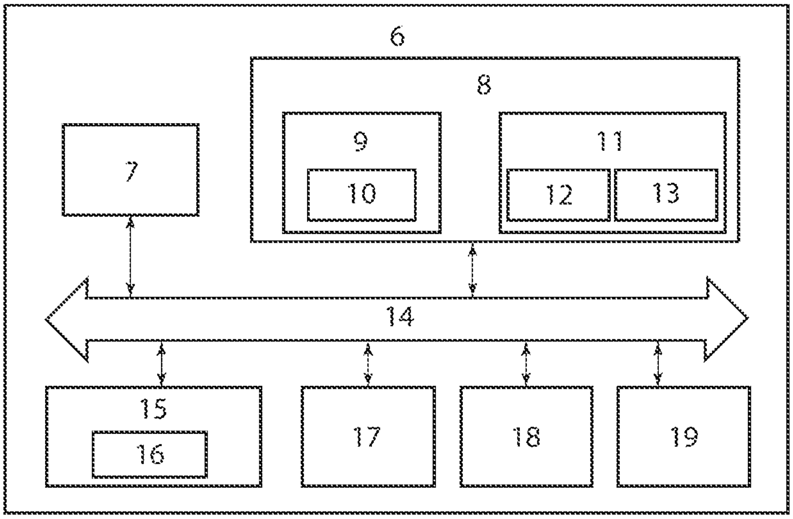
FIG. 4 is a flow chart of an exemplary method for determining fuel leak of one or more fuel injectors of a fuel injection system of a combustion engine.

FIG. 4 is a schematic diagram of a computer system 6 for implementing examples disclosed herein. The computer system 6 is adapted to execute instructions from a computer-readable medium to perform these and/or any of the functions or processing described herein. The computer system 6 may be connected (e.g., networked) to other machines in a LAN, an intranet, an extranet, or the Internet. While only a single device is illustrated, the computer system 6 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 6 may comprise at least one computing device or electronic device capable of including firmware, hardware, and/or executing software instructions to implement the functionality described herein. The computer system 6 may include a processor device 7 (may also be referred to as a control unit), a memory 8, and a system bus 14. The computer system 6 may include at least one computing device having the processor device 7. The system bus 14 provides an interface for system components including, but not limited to, the memory 8 and the processor device 7. The processor device 7 may include any number of hardware components for conducting data or signal processing or for executing computer code stored in memory 8. The processor device 7 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 14 may be any of several types of bus structures that may further interconnect to a memory bus (with or without a memory controller), a peripheral bus, and/or a local bus using any of a variety of bus architectures. The memory 8 may be one or more devices for storing data and/or computer code for completing or facilitating methods described herein. The memory 8 may include database components, object code components, script components, or other types of information structure for supporting the various activities herein. Any distributed or local memory device may be utilized with the systems and methods of this description. The memory 8 may be communicably connected to the processor device 7 (e.g., via a circuit or any other wired, wireless, or network connection) and may include computer code for executing one or more processes described herein. The memory 8 may include non-volatile memory 9 (e.g., read-only memory (ROM), erasable programmable read-only memory (EPROM), electrically erasable programmable read-only memory (EEPROM), etc.), and volatile memory 11 (e.g., random-access memory (RAM)), or any other medium which can be used to carry or store desired program code in the form of machine-executable instructions or data structures and which can be accessed by a computer or other machine with a processor device 7. A basic input/output system (BIOS) 10 may be stored in the non-volatile memory 9 and can include the basic routines that help to transfer information between elements within the computer system 6.

The computer system 6 may further include or be coupled to a non-transitory computer-readable storage medium such as the storage device 15, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 15 and other drives associated with computer-readable media and computer-usable media may provide non-volatile storage of data, data structures, computer-executable instructions, and the like.

A number of modules can be implemented as software and/or hard coded in circuitry to implement the functionality described herein in whole or in part. The modules may be stored in the storage device 15 and/or in the volatile memory 11, which may include an operating system 12 and/or one or more program modules 13. All or a portion of the examples disclosed herein may be implemented as a computer program product 16 stored on a transitory or non-transitory computer-usable or computer-readable storage medium (e.g., single medium or multiple media), such as the storage device 15, which includes complex programming instructions (e.g., complex computer-readable program code) to cause the processor device 7 to carry out the steps described herein. Thus, the computer-readable program code can comprise software instructions for implementing the functionality of the examples described herein when executed by the processor device 7. The processor device 7 may serve as a controller or control system for the computer system 6 that is to implement the functionality described herein.

The computer system 6 also may include an input device interface 17 (e.g., input device interface and/or output device interface). The input device interface 17 may be configured to receive input and selections to be communicated to the computer system 6 when executing instructions, such as from a keyboard, mouse, touch-sensitive surface, etc. Such input devices may be connected to the processor device 7 through the input device interface 17 coupled to the system bus 14 but can be connected through other interfaces such as a parallel port, an Institute of Electrical and Electronic Engineers (IEEE) 1394 serial port, a Universal Serial Bus (USB) port, an IR interface, and the like. The computer system 6 may include an output device interface 18 configured to forward output, such as to a display, a video display unit (e.g., a liquid crystal display (LCD) or a cathode ray tube (CRT)). The computer system 6 may also include a communications interface 19 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The invention claimed is:

1. A system comprising a fuel injection system and a computer system comprising a processor device, said fuel injection system comprising:

a fuel rail defining a fuel conduit for transporting fuel, at least one fuel pump fluidly connected to the fuel rail, a plurality of fuel injectors, each one of the plurality of fuel injectors being fluidly connected to the fuel rail, and a proportional-integral-derivative (PID) controller adapted to control the at least one fuel pump based on at least a fuel pressure in the fuel rail, said processor device being configured to:

with the engine running, control the at least one fuel pump to increase the pressure in the fuel rail to a baseline pressure at which an integral response of the PID controller reaches a predetermined integral response threshold, and for each respective fuel injector, determine a primary reference integral response associated with the fuel injector by:

fluidly isolating each fuel injector from the fuel rail, with all other fuel injectors fluidly connected to the fuel rail, by controlling a respective valve between the respective fuel injector and the fuel rail, with the engine running, controlling the at least one fuel pump to increase the pressure in the fuel rail until the pressure in the fuel rail reaches the baseline pressure, and obtaining the respective primary reference integral response by obtaining the current integral response, thereby providing information indicating the leak rate of each fuel injector.

2. The system according to claim 1, wherein the processor device is further configured to:

before, or after, determining the primary reference integral responses, for each fuel pump or combination of fuel pumps used together/to be used together when determining the primary reference integral responses, determine a respective baseline integral response associated with the fuel pump or combination of fuel pumps, by:

with the engine running with all fuel injectors fluidly connected to the fuel rail, supplying fuel to the fuel rail only using the respective fuel pump or combination of fuel pumps, setting the fuel pressure in the fuel rail to the baseline pressure, and obtaining the respective baseline integral response by obtaining the current integral response, thereby providing information indicating a reference leak rate for use when assessing the leak rate of each fuel injector.

3. A method for determining fuel leak of one or more fuel injectors of a fuel injection system of a combustion engine, said fuel injection system comprising:

a fuel rail defining a fuel conduit for transporting fuel, at least one fuel pump fluidly connected to the fuel rail, a plurality of fuel injectors, each one of the plurality of fuel injectors being fluidly connected to the fuel rail, and a proportional-integral-derivative (PID) controller adapted to control the at least one fuel pump based on at least a fuel pressure in the fuel rail, said method comprising:

with the engine running, controlling the at least one fuel pump to increase the pressure in the fuel rail to a baseline pressure at which an integral response of the PID controller reaches a predetermined integral response threshold, and for each respective fuel injector determining a primary reference integral response associated with the fuel injector, by:

with each respective fuel injector fluidly isolated from the fuel rail, with all other fuel injectors fluidly connected to the fuel rail, and with the engine running, controlling the at least one fuel pump to increase the pressure in the fuel rail until the pressure in the fuel rail reaches the baseline pressure, and obtaining the primary reference integral response associated with the respective isolated fuel injector by obtaining the current integral response, thereby providing information indicating the leak rate of each fuel injector.

4. The method of claim 3, further comprising:

for each fuel pump or combination of fuel pumps used together/to be used together when determining the primary reference integral responses, determining a respective baseline integral response associated with the fuel pump or combination of fuel pumps, by:

with the engine running, with all fuel injectors fluidly connected to the fuel rail, controlling the fuel pumps such that fuel is supplied to the fuel rail only by the fuel pump or combination of fuel pumps, controlling the pressure in the fuel rail to the baseline pressure, and obtaining the respective baseline integral response by obtaining the current integral response, thereby providing information indicating a reference leak rate for use when assessing the leak rate of each fuel injector.

5. The method according to claim 3, wherein the fuel injection system comprises at least two fuel pumps, wherein said determination of the primary reference integral response for each fuel injector is performed using only one fuel pump at a time, by enabling one of the fuel pumps, and disabling the other fuel pump(s).

6. The method according to claim 5, wherein a subset of the fuel injectors are pumping fuel injectors, wherein each fuel pump is a pump of a respective one of the pumping fuel injectors, and wherein the determination of the primary reference integral response for each fuel injector comprises, for each pumping fuel injector fluidly isolated from the fuel rail, using one of the other pumping fuel injectors as the fuel pump for pressurizing the fuel rail when obtaining the primary reference integral response associated with the fluidly isolated pumping fuel injector.

7. The method according to claim 6, wherein the fuel injection system comprises at least three pumping fuel injectors, and wherein the method further comprises determining two reference pumping fuel injectors, said determination of two reference pumping fuel injectors to be performed before determining the primary reference integral responses, wherein the determination of the two reference pumps comprises:

obtaining a secondary reference integral response for each pumping fuel injector by, for each respective pumping fuel injector:

with the engine running, enabling the fuel supply to the fuel rail by the fuel pump of the respective pumping fuel injector, and disabling the fuel supply to the fuel rail by the other pumping fuel injectors, and obtaining the respective secondary reference integral response by obtaining the current integral response, wherein the method further comprises determining the two reference pumping fuel injectors as the two pumping fuel injectors with most similar secondary reference integral responses, and wherein the determination of the primary reference integral responses is performed using only the fuel pumps of the two reference pumping fuel injectors.

8. The method of claim 3, further comprising:

for each respective fuel injector:

determining a fuel leak value of the fuel injector, said fuel leak value being a difference between the primary reference integral response associated with the fuel injector and the respective baseline integral response, or, if no baseline integral response has been obtained, a difference between the primary reference integral response associated with the fuel injector and the predetermined integral response threshold.

9. The method of claim 8, further comprising:

comparing each fuel leak value of all fuel injectors to a predetermined first fuel leak threshold, and, in response to the fuel leak value exceeding the first fuel leak threshold, providing an indication that the fuel injector associated with the fuel leak value should be replaced.

10. The method (M) of claim 9, wherein the fuel injection system comprises at least two fuel pumps, wherein said determination of the primary reference integral response for each fuel injector is performed using only one fuel pump at a time, by enabling one of the fuel pumps, and disabling the other fuel pump(s), and wherein a subset of the fuel injectors are pumping fuel injectors, wherein each fuel pump is a pump of a respective one of the pumping fuel injectors, and wherein the determination of the primary reference integral response for each fuel injector comprises, for each pumping fuel injector fluidly isolated from the fuel rail, using one of the other pumping fuel injectors as the fuel pump for pressurizing the fuel rail when obtaining the primary reference integral response associated with the fluidly isolated pumping fuel injector, the method further comprising:

comparing a first aggregate fuel leak value to a first aggregate fuel leak threshold, said first aggregate fuel leak value being the sum of the respective fuel leak values of all pumping fuel injectors not yet determined to need replacement, said first aggregate fuel leak threshold being a second fuel leak threshold multiplied by the number of pumping fuel injectors not yet determined to need replacement, and said second fuel leak threshold being lower than the first fuel leak threshold, and, in response to the first aggregate fuel leak value exceeding the first aggregate fuel leak threshold, providing an indication that all pumping fuel injectors should be replaced.

11. The method according to claim 9, further comprising:

comparing a second aggregate fuel leak value to a second aggregate fuel leak threshold, said second aggregate fuel leak value being the sum of the respective fuel leak values of all fuel injectors except the pumping fuel injectors, and except any fuel injectors for which an indication of replacement has been provided, said second aggregate fuel leak threshold being a third fuel leak threshold multiplied by the number of fuel injectors of the fuel injection system, except the pumping fuel injectors, and except any fuel injectors for which an indication of replacement has been provided, said third fuel leak threshold being lower than the first fuel leak threshold, and in response to the second aggregate fuel leak value exceeding the second aggregate fuel leak threshold, providing an indication that all fuel injectors not being pumping fuel injectors, should be replaced.

12. The method of claim 3, wherein fluid isolation of each respective fuel injector is achieved by:

closing one or more valves between the fuel rail and the fuel injector to be fluidly isolated, such that fuel is prevented from moving between the fuel injector and the fuel rail.

13. The method of claim 3, wherein fluid isolation of each respective fuel injector is achieved by:

with the engine stopped, physically removing the fuel injector to be fluidly isolated from the fuel rail and plugging a corresponding port of the fuel rail.

14. A vehicle comprising the processor device to perform the method of claim 3.

15. A computer program product comprising program code for performing, when executed by the processor device, the method of claim 3.

16. A control system comprising one or more control units configured to perform the method of claim 3.

17. A non-transitory computer-readable storage medium comprising instructions, which when executed by the processor device, cause the processor device to perform the method of claim 3.

* * * * *